United States Patent [19]
Anderton et al.

[11] Patent Number: 5,711,586
[45] Date of Patent: Jan. 27, 1998

[54] TRACK BUSHING ASSEMBLY AND METHOD

[75] Inventors: Peter W. Anderton; Lawrence J. Cobb; Joseph D. Groves, all of Peoria; Dennis R. Shookman, Washington, all of Ill.

[73] Assignee: Caterpillar Inc., Peoria, Ill.

[21] Appl. No.: 657,253

[22] Filed: Jun. 3, 1996

[51] Int. Cl.$^6$ ............................................. B62D 55/21
[52] U.S. Cl. ...................... 305/201; 305/102; 305/202; 384/125; 384/276
[58] Field of Search ........................... 305/202, 102, 305/103, 104, 185, 200, 201, 205; 384/125, 276, 302; 59/78, 84, 85, 87, 88

[56] References Cited

U.S. PATENT DOCUMENTS

| | | | |
|---|---|---|---|
| 2,882,103 | 4/1959 | Johnson et al. | 305/202 |
| 3,336,086 | 8/1967 | Reinsma | 305/103 |
| 4,726,695 | 2/1988 | Showalter | 384/125 X |
| 5,461,852 | 10/1995 | Nagamatsu | 59/84 |

*Primary Examiner*—Russell D. Stormer
*Attorney, Agent, or Firm*—Dennis C. Skarvan; Diana L. Charlton

[57] ABSTRACT

A track bushing for use with a track assembly of a track-type machine includes a generally cylindrical member having ends adapted for mounting in opposing end portions of a track link and a longitudinal bore extending between the ends. The inner surface of the bore defines first and second load bearing portions at each of the ends. Each of the first load bearing portions define a first conical surface tapering radially inward from each of the ends at a first angle, and each of the second load bearing portions define a second conical surface tapering radially inward from each of the first conical surfaces at a second angle. In the bushing's assembled state, the first angle is in the range of 0.09 degrees to 0.18 degrees and the second angle is in the range of −0.01 degrees to 0.01. In the bushing's free state, the first angle is in the range of 0.19 degrees to 0.27 degrees and the second angle is in the range of 0.06 degrees to 0.08 degrees.

9 Claims, 2 Drawing Sheets

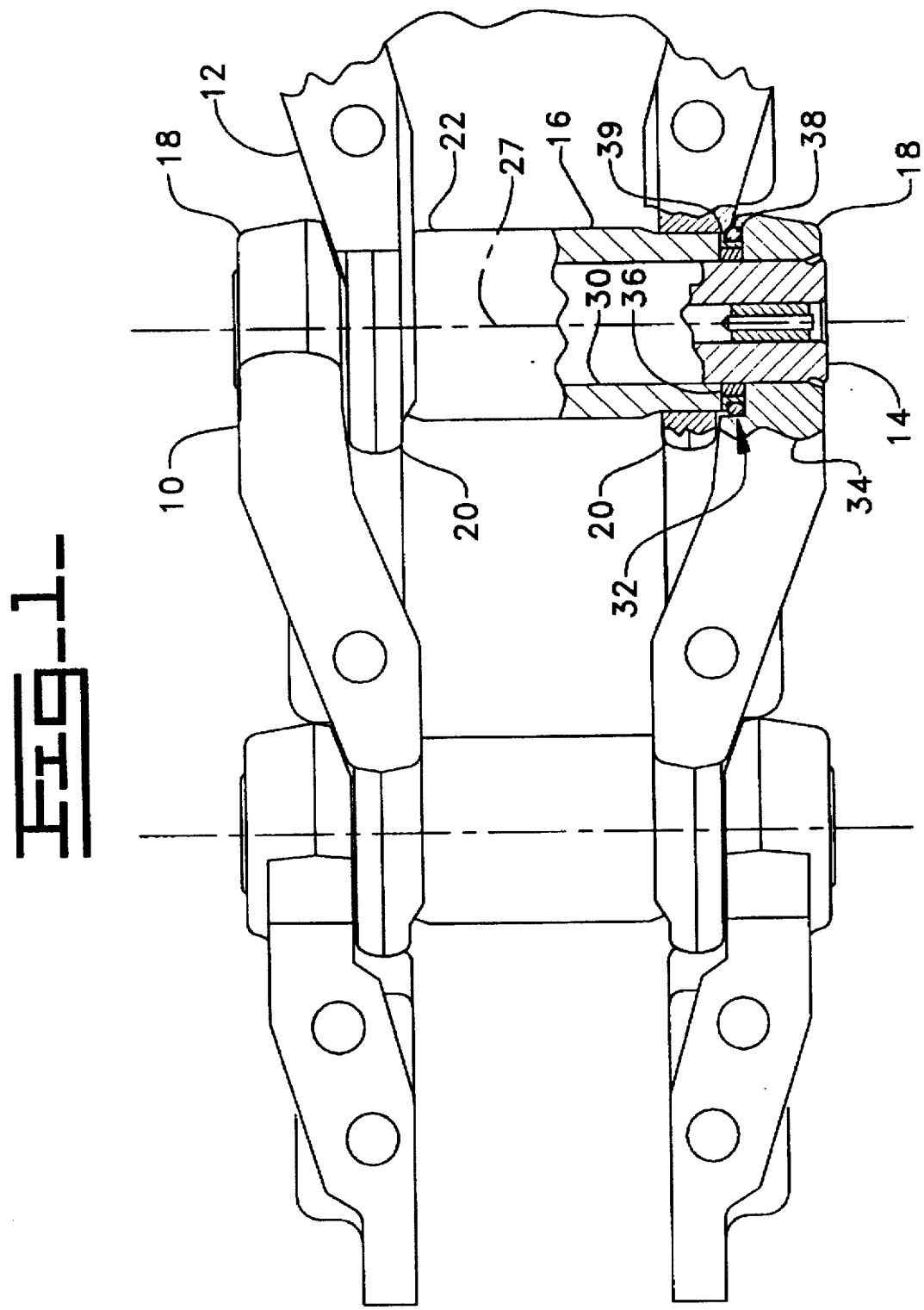

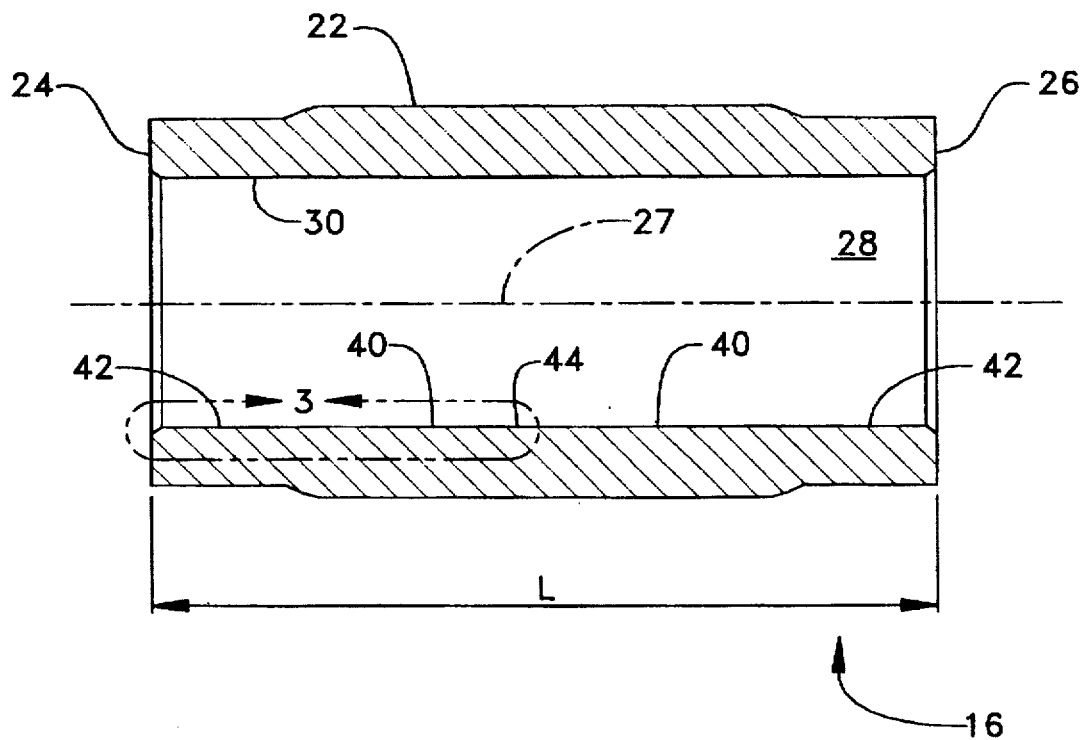
Fig_2_
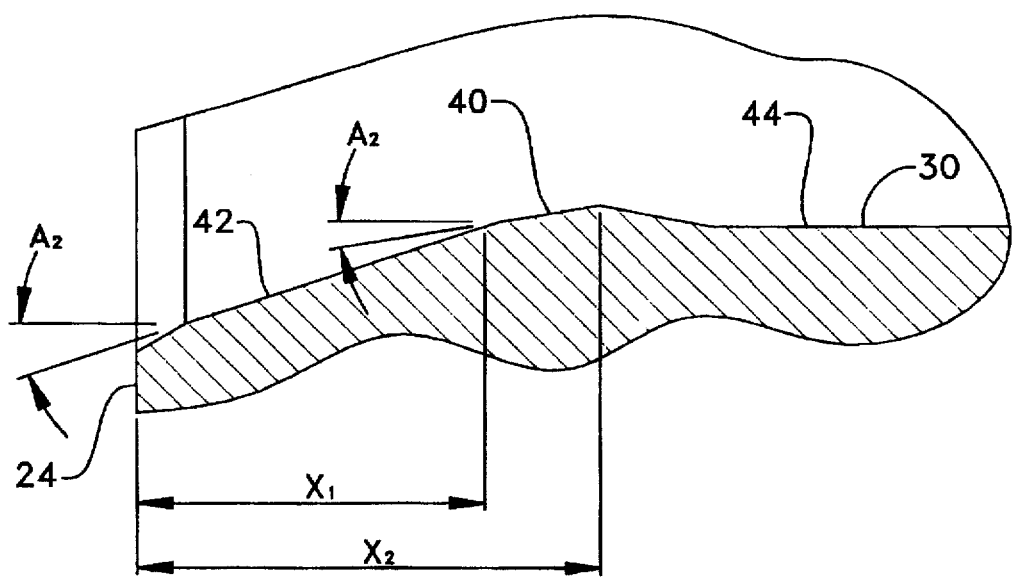
Fig_3_

TRACK BUSHING ASSEMBLY AND METHOD

DESCRIPTION

1. Technical Field

The present invention relates generally to a track bushing for use with an endless track of a track-type machine and, more particularly, to a track bushing having an inner profile which, in its assembled state pressed within a track link, cooperates with a track pin to reduce wear.

2. Background Art

Endless track assemblies for crawler-type construction equipment include a plurality of spaced co-acting track links with laterally overlapping ends joined by track bushings and track pins. Conventionally, the pins are coaxially disposed within the track bushings and rotate or pivot within the bushings. Examples of this type of endless track assembly are disclosed in U.S. Pat. Nos. 4,639,995 issued Feb. 3, 1987 to Garman et al., 3,762,778 issued Oct. 2, 1973 to Boggs et al., and 5,249,868 issued Oct. 5, 1993 to Watts.

The main cause of damage to the track assembly is wear and fatigue. Wear also results from the harsh contaminated environments in which the track assembly operates. In some cases, extreme wear in the form of galling or metal transfer occurs between the pin and bushing. Prior inner bushing profiles have resulted in a localized concentration of heat and pressure at the pin/bushing interface which contributes to bushing wear and, further, failure of the seal protecting the pin and bushing.

The present invention is directed to a track assembly which overcomes one or more of the problems as set forth above. In particular, the present invention is directed to a track assembly having reduced wear and therefore longer life.

DISCLOSURE OF THE INVENTION

According to one embodiment of the present invention, a track assembly for use with a track-type machine is disclosed, comprising a first track link having first opposing end portions, a track bushing having ends mounted in the first opposing end portions and extending therebetween, the track bushing including an inner peripheral surface defining a longitudinal bore having a longitudinal axis and extending through the track bushing between the ends, a second track link having second opposing end portions, a track pin mounted in the second opposing end portions and extending therebetween, the track pin being disposed in the longitudinal bore of the track bushing for articulating motion, the inner peripheral surface defining first and second load bearing portions at each of the ends, each of the first load bearing portions being a first conical surface having a first angle relative to the longitudinal axis and each of the second load bearing portions being a second conical surface having a second angle relative to the longitudinal axis, each of the first conical surfaces tapering radially inward from each of the ends at the first angle and each of the second conical surfaces tapering radially inward from each of the first conical surfaces at the second angle, the second angle being less than the first angle.

According to another embodiment of the present invention, a track bushing is disclosed for use with a track assembly of a track-type machine, comprising a generally cylindrical member having ends adapted for mounting in opposing end portions of a track link, the generally cylindrical member including an inner peripheral surface defining a longitudinal bore having a longitudinal axis and extending through the track bushing between the ends, the inner peripheral surface defining first and second load bearing portions at each of the ends, each of the first load bearing portions being a first conical surface having a first angle relative to the longitudinal axis and each of the second load bearing portions being a second conical surface having a second angle relative to the longitudinal axis, each of the first conical surfaces tapering radially inward from each of the ends at the first angle and each of the second conical surfaces tapering radially inward from each of the first conical surfaces at the second angle, the second angle being less than the first angle.

According to another embodiment of the present invention, a method of operation of a track assembly for use with a track-type machine is disclosed, the track assembly including a first track link having first opposing end portions, a track bushing having ends mounted in the first opposing end portions and extending therebetween, the track bushing including an inner peripheral surface defining a longitudinal bore having a longitudinal axis and extending through the track bushing between the ends, a second track link having second opposing end portions, a track pin mounted in the second opposing end portions and extending therebetween, the track pin being disposed in the longitudinal bore of the track bushing for articulating motion, the method comprising the steps of (a) contacting a first load bearing portion of the inner peripheral surface with a first portion of the track pin under a first load, the first load bearing portion having a first length and being generally cylindrical and parallel with the longitudinal axis when assembled in the first track so as to be contacted along the first length under the first load, and (b) contacting a second load bearing portion of the inner peripheral surface with a second portion of the track pin under a second load greater than the first load, the second load bearing portion having a second length and being a conical surface having an angle relative to the longitudinal axis and tapering radially outward from the first load bearing portion at the second angle when assembled in the first track so as to be contacted at increasing portions along the second length as the second load increases.

BRIEF DESCRIPTION OF THE DRAWINGS

FIG. 1 is top plan view of a track link assembly in which the track pin and bushing assembly is broken out in cross-section according to one embodiment of the present invention.

FIG. 2 is an elevational cross-sectional view of the track bushing of FIG. 1.

FIG. 3 is an exploded elevational partial cross-sectional view of the inner peripheral surface of the track bushing of FIG. 2.

BEST MODE FOR CARRYING OUT THE INVENTION

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a portion of an endless track is shown including track links 10 and 12 connected together by pin 14 and bushing 16. Pin 14 is pressed within end portions 18 of link 10. Bushing 16 is pressed within end portions 20 of link 12. Referring now also to FIG. 2, bushing 16 is formed having a generally cylindrical shape and includes an outer peripheral surface 22 extending generally the full length 'L' of the bushing, a pair of radial end surfaces 24 and 26, and a longitudinal bore 28 with respect to longitudinal axis 27. An inner peripheral surface 30 extends between and opens to each of the radial end surfaces 24 and 26 to define the bore 28.

Pin 14 is rotatably disposed within bore 28 and articulates through an approximately 30 degree range of motion as the endless track is drivingly rotated about various drive and idler sprockets and guide rollers of a track-type machine (not shown). A lip seal assembly 32 is disposed within a seal cavity 34 defined in end portion 18 of link 10 to contain lubricating oil between the pin 14 and bushing 16 as described hereinafter in greater detail, and also to prevent debris from entering between pin 14 and bushing 16. Seal assembly 32 is a conventional track seal, for example, such as that disclosed in U.S. Pat. No. 4,262,914, which is assigned to the assignee hereof. A spacer ring 36 is disposed within cavity 34 radially inwardly of sealing members 38 and 39 so as to be on the lubricated side of the seals. Sealing member 39 is a lip seal which contacts bushing end surface 26 to prevent egress of oil from and ingress of debris to between the pin and bushing. Sealing member 38 is biased between sealing member 39 and cavity 34 to maintain sealing contact between bushing 16 and end portion 18 of link 10. Spacer ring 36 is of a predetermined length sufficient to control the axial spacing between the end portions 18 of link 10 and bushing 16 to prevent crushing of the sealing members 38 and 39.

Referring now to FIGS. 2 and 3, a portion of inner peripheral surface 30 in its unassembled free or unrestrained state is shown in greater detail. Because the ends of bushing 16 are pressed within end portions 20 of link 12, the profile shown in FIG. 3 is altered under compressive loading to that shown in dashed lines in FIG. 2. In either case, surface 30 comprises first and second load bearing portions 40 and 42 disposed at each end of bushing 16 and a middle portion 44 disposed between load bearing portions 40 and 42. First load bearing portion 40 has a length in the range of 0.03 L to 0.05 L (see below) and is the primary wearing portion of surface 30 which contacts pin 14 during no-load and lightly loaded operation. As loading of the pin and bushing increases and pin 14 or bushing 16 deflects, increasing portions of load bearing portion 42 of surface 30 come into contact with pin 14 to distribute the increased loading over a greater surface area. Middle portion 44 serves as an oil reservoir for pumping and distributing oil from within pin 14 to the first and second load bearing portions as a result of the articulating motion between pin 14 and bushing 16 during track operation.

In the specific embodiment shown, surface 30 is pressed within end portion 20 under a compressive loading of 60,000 pounds and has a diametral clearance relative to pin 14 of approximately 0.009 millimeters per millimeter of diameter. At such a loading, bushing 16 deflects to achieve the following desired profile for surface 30:

| Distance 'X' | Angle 'A' |
| --- | --- |
| X1: 0 to 0.17 L–0.36 L | A1: 0.09 deg to 0.18 deg |
| X2: 0.17 L–0.36 L to 0.21 L–0.40 L | A2: 0.01 deg to 0.01 deg | where;

'X' is the measured distance from either end 24 or 26 as a function of the overall length 'L' of the bushing, and 'A' is the measured angle relative to axis 27.

To achieve such a profile under such a loading, the corresponding profile of surface 30 in its free state is:

| Distance 'X' | Angle 'A' |
| --- | --- |
| X1: 0 to 0.17 L–0.36 L | A1: 0.19 deg to 0.27 deg |
| X2: 0.17 L–0.36 L to 0.21 L–0.40 L | A2: 0.06 deg to 0.08 deg | where;

'X' is the measured distance from either end 24 or 26 as a function of the overall length 'L' of the bushing, and 'A' is the measured angle relative to axis 27.

By providing first and second load bearing portions as described above, high pin to bushing loads are distributed over a greater area of contact between the pin and bushing to reduce bushing wear. As a result, heat loading and galling of the pin and/or bushing adjacent to the ends of the bushing is minimized. Also, oil starvation adjacent to the ends of the bushing is eliminated to maintain lubrication between the pin and bushing as well as at seal assembly 32 to extend seal life.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A track assembly for use with a track-type machine, comprising:

a first track link having first opposing end portions;

a track bushing having ends mounted in said first opposing end portions and extending therebetween, said track bushing including an inner peripheral surface defining a longitudinal bore having a longitudinal axis and extending through said track bushing between said ends;

a second track link having second opposing end portions;

a track pin mounted in said second opposing end portions and extending therebetween, said track pin being disposed in said longitudinal bore of said track bushing for articulating motion;

said inner peripheral surface defining first and second load bearing portions at each of said ends;

each of said first load bearing portions being a first conical surface having a first angle relative to said longitudinal axis and each of said second load bearing portions being a second conical surface having a second angle relative to said longitudinal axis;

each of said first conical surfaces tapering radially inward from each of said ends at said first angle and each of said second conical surfaces tapering radially inward from each of said first conical surfaces at said second angle, said second angle being less than said first angle.

2. The track assembly of claim 1, wherein said first angle is in the range of 0.09 degrees to 0.18 degrees and said second angle is in the range of −0.01 degrees to 0.01.

3. The track assembly of claim 1, wherein said track bushing has a predetermined length 'L' and each of said first conical surfaces extends from one of said ends a distance in the range of 0.17 L to 0.36 L.

4. The track assembly of claim 3, wherein each of said second conical surfaces extends from a respective one of said first conical surfaces a distance in the range of 0.03 L to 0.05 L.

5. A track bushing for use with a track assembly of a track-type machine, comprising:

a generally cylindrical member having ends adapted for mounting in opposing end portions of a track link, said generally cylindrical member including an inner peripheral surface defining a longitudinal bore having a longitudinal axis and extending through said track bushing between said ends;

said inner peripheral surface defining first and second load bearing portions at each of said ends;

each of said first load bearing portions being a first conical surface having a first angle relative to said longitudinal axis and each of said second load bearing portions being a second conical surface having a second angle relative to said longitudinal axis;

each of said first conical surfaces tapering radially inward from each of said ends at said first angle and each of said second conical surfaces tapering radially inward from each of said first conical surfaces at said second angle, said second angle being less than said first angle.

6. The track bushing of claim 5, wherein said first angle is in the range of 0.19 degrees to 0.27 degrees and said second angle is in the range of 0.06 degrees to 0.08.

7. The track assembly of claim 5, wherein said track bushing has a predetermined length 'L' and each of said first conical surfaces extends from one of said ends a distance in the range of 0.17 L to 0.36 L.

8. The track assembly of claim 7, wherein each of said second conical surfaces extends from a respective one of said first conical surfaces a distance in the range of 0.03 L to 0.05 L.

9. A method of operation of a track assembly for use with a track-type machine, the track assembly including a first track link having first opposing end portions, a track bushing having ends mounted in said first opposing end portions and extending therebetween, said track bushing including an inner peripheral surface defining a longitudinal bore having a longitudinal axis and extending through said track bushing between said ends, a second track link having second opposing end portions, a track pin mounted in said second opposing end portions and extending therebetween, said track pin being disposed in said longitudinal bore of said track bushing for articulating motion, the method comprising the steps of:

forming first and second load bearing portions at each of said ends, each of said first load bearing portions being a first conical surface having a first angle relative to said longitudinal axis and each of said second load bearing portions being a second conical surface having a second angle relative to said longitudinal axis;

contacting the first load bearing portion of said inner peripheral surface with a first portion of said track pin under a first load, said first load bearing portion having a first length and being generally cylindrical and parallel with said longitudinal axis when assembled in said first track so as to be contacted along said first length under said first load;

contacting the second load bearing portion of said inner peripheral surface with a second portion of said track pin under a second load greater than said first load, said second load bearing portion having a second link and being a conical surface having an angle relative to said longitudinal axis and tapering readily outward from said first load bearing portion at said second angle when assembled in said first track so as to be contacted at increasing portions long with second link as said second load increases.

\* \* \* \* \*